US007944891B2

(12) United States Patent
Whinnett et al.

(10) Patent No.: US 7,944,891 B2
(45) Date of Patent: May 17, 2011

(54) FREQUENCY TRANSFORMATION BASED TRANSMIT BEAMFORMING IN A COMMUNICATION SYSTEM

(75) Inventors: Nick W. Whinnett, Marlbough (GB); Fei Tong, Swindon (GB); Frederick W. Vook, Schaumburg, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 335 days.

(21) Appl. No.: 12/168,951

(22) Filed: Jul. 8, 2008

(65) Prior Publication Data
US 2010/0008268 A1 Jan. 14, 2010

(51) Int. Cl.
*H04W 4/00* (2009.01)
(52) U.S. Cl. ........................................... 370/334
(58) Field of Classification Search .......... 370/328–339; 455/13.3
See application file for complete search history.

(56) References Cited

U.S. PATENT DOCUMENTS

| | | | |
|---|---|---|---|
| 6,134,261 A | 10/2000 | Ryan | |
| 6,477,161 B1 * | 11/2002 | Hudson et al. | 370/342 |
| 6,694,155 B1 * | 2/2004 | Chin et al. | 455/562.1 |
| 2002/0061768 A1 * | 5/2002 | Liang et al. | 455/561 |
| 2009/0116569 A1 * | 5/2009 | Jin | 375/260 |

OTHER PUBLICATIONS

Dong, Open-Loop Beamforming for Frequency-Division Duplex Mobile Wireless Access, IEEE, 5 pages, Jul. 2007.*
Dong, Liang et al.: Predictive Downlink Beamforming for Wideband CDMA Over Rayleigh-Fading Channels, IEEE Transactions on Wireless Communications, vol. 4, No. 2, Mar. 2005, pp. 410-421.
Liu, Shang-Chieh et al.: Joint Frequency Compensation and Angle Estimation for Array Processing and FHMA Networks, 0-7803-4249-6/97/$10.00 1997 IEEE, pp. 271-275.
Liang, Ying-Chang et al.: FDD DS-CDMA Downlink Beamforming by Modifying Uplink Beamforming Weights, 0-7803-6507-0/00/$10.00 2000 IEEE, VTC 2000, pp. 107-174.
Koutalos, Antonis et al.: Effect of Frequency Division Duplex on Open Look Downlink Beamforming in WCDMA Systems, 0-7803-7467-3/02/$17.00 2002 IEEE, pp. 686-690.
Liang, Ying-Chang et al.: Downlink Channel Covariance Matrix (DCCM) Estimation and Its Applications in Wireless DS-CDMA Systems, IEEE Journal on Selected Areas in Communications, vol. 19, No. 2, Feb. 2001, 0733-8716/01$10.00 2001 IEEE, pp. 222-228.
Hugl, Klaus et al.: Downlink Beamforming For Frequency Division Duplex Systems, Advanced Signal Processing for Communications, Global Telecommunications Conference-Globecom '99, 0-7803-5796-5/99/$10.00 1999 IEEE, pp. 2097-2101.
Fonollosa, Javier R. et al.: Downlink Beamforming for Cellular Mobile Communications in Frequency Selective Channels, 0-7803-3944-4/97/$10.00 1997 IEEE, pp. 197-200.
Aste, T. et al.: Downlink Beamforming Avoiding DOA Estimation for Cellular Mobile Communications, 0-7803-4428-6/98 $10.00 1998 IEEE, pp. 3313-3316.
Jotten, C.A. et al.: Comparison of Transmit Array Algorithms for Code Division Multiple Access Downlinks Operating in the Frequency Division Duplexing Mode, 0-7803-7244-1/$10.00 2001 IEEE, pp. E-16 to E-21.

(Continued)

*Primary Examiner* — Frank Duong (57) ABSTRACT

The present invention provides a system and method for transmit beamforming in a Frequency Division Duplex communication system. A first step (600) includes correcting for differences between transceiver receive and transmit responses within a base station. A next step (604) obtaining a beamforming weight of a phase antenna array on an uplink. A next step (606) transforming the uplink beamforming weight a downlink beamforming weight by applying a phase correction that is a function of wavelength at the uplink and downlink frequencies and distance between antenna elements.

9 Claims, 6 Drawing Sheets

OTHER PUBLICATIONS

Dahl, Tobias et al.: Blind Beamforming in Frequency Division Duplex MISO Systems Based on Time Reversal Mirrors, 2005 IEEE 6th Workshop on Signal Processing Advances in Wireless Communications, 0-7803-8867-4/05/$20.00 2005 IEEE, pp. 640-644.

Raleigh, Gregory G. et al.: A Blind Adaptive Transmit Antenna Algorithm for Wireless Communication, 0-7803-2486-2/95 $4.00 1995 IEEE, pp. 1494-1499.

* cited by examiner

FREQUENCY TRANSFORMATION BASED TRANSMIT BEAMFORMING IN A COMMUNICATION SYSTEM

FIELD OF THE INVENTION

The field of the invention relates to wireless communication systems, and in particular to, phased array transmit antennas in a communication system.

BACKGROUND OF THE INVENTION

With a phased array antenna installed at base station, beamforming can enable a base station to provide better coverage for mobile stations that are operating at the edge of the cell. To enable the base station to form a beam on the transmit side pointing in the right direction for a specific mobile station, the base station needs to know the spatial channel information. As is known in the art, a covariance matrix can be obtained by correlating the signal vector received at the phased array. In Time Division Duplex (TDD) operation, this covariance matrix observed on the uplink can be used for transmit beamforming given that the time delay between receiving and transmitting is within the coherence time of the time-variant channel. However, in Frequency Division Duplex (FDD) operation the downlink covariance matrix is different from the one obtained on the uplink, so the beamforming design in FDD systems requires more attention.

One option is to operate the beamforming in closed-loop mode where the mobile station provides feedback to its base station. The mobile station can obtain the channel matrix using reference signals orthogonal amongst the base station transmit antennas and feedback the channel state information. However, this scheme requires signaling overhead (which consumes uplink resources), and such feedback suffers from quantization error and bit errors in the course of signaling back the channel state information.

Another option is to provide open-loop beamforming, which does not require feedback from the mobile station and therefore has the advantage of no signaling overhead. As is known in the art, when the frequency separation is relatively small with respect to the carrier frequency, the propagation paths between the uplink and downlink are highly correlated. Therefore, by processing the uplink spatial channel information, optimal or near-optimal beamforming can be generated on the downlink. One such technique is to form the beam using the angular spectrum, which is derived from the uplink and is unchanged between the frequency bands. However, this approach requires angle of arrival (AoA) estimation, which is computationally intensive.

The above operation only considers the propagation channel. However, in a practical communication system, the overall channel includes the internal signal path. In TDD mode, the accounting for both the propagation channel and the internal signal paths is addressed by array calibration. In FDD mode, calibration of the internal signal paths is still possible using a calibration transceiver in a way similar to what is done in TDD. However the antenna response on the two frequency bands varies, and the calibration of the antenna response variation is extremely hard if not impossible to accomplish. Therefore, the unequal antenna response on the uplink and downlink may have an adverse impact on the open-loop beamforming gain.

Therefore, it would be advantageous to have an approach to form beams in FDD mode without either feedback from mobile station or calibration on two carrier frequencies.

BRIEF SUMMARY OF THE INVENTION

The present invention addresses transmit beamforming in Frequency Division Duplex operation of a communication system based on the frequency transformation of the phase response. This technique can be used with eigen-beamforming and requires little processing. In particular, the present invention provides a direct frequency transformation-based beamforming and addresses the impact of unequal antenna response on the achievable beamforming gain. Simulation results show that the proposed eigen-beamforming is computationally efficient and robust to antenna response variation.

In some embodiments, a first step includes correcting for differences between transceiver receive and transmit responses within a base station. A next step obtains a beamforming weight of a phase antenna array on an uplink. A next step transforms the uplink beamforming weight to a downlink beamforming weight by applying a phase correction that is a function of wavelength at the uplink and downlink frequencies and distance between antenna elements.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION OF THE PREFERRED EMBODIMENTS

The present invention addresses transmit beamforming in Frequency Division Duplex (FDD) operation of a communication system based on the frequency transformation of the phase response. This technique can be used with eigen-beamforming and requires little processing. It should be noted that even though frequency translation has been studied in the art, those solutions are different from, and more complex than, the solution proposed by the present invention. In particular, the present invention provides a direct frequency transformation based beamforming and addresses the impact of unequal antenna response on the achievable beamforming gain. Simulation results (described below) show that the proposed eigen-beamforming is computational efficient and robust to antenna response variation.

The technique of the present invention described herein, provides a method for obtaining transmission weights in an FDD system without requiring feedback from the mobile. The loss in performance of the adaptive antenna due to uplink/downlink de-correlation in FDD is mitigated by a low complexity adjustment of the eigen-beamforming weight vector, which does not require feedback from the mobile.

Specifically, in the present invention, signals received on the uplink are used to form a spatial correlation matrix, after correcting for differences between hardware receive and transmit responses within the base station (which requires calibration measurements as for TDD). A principal eigen-vector is obtained from the spatial correlation matrix which is then corrected for the frequency difference between uplink and downlink by adjusting the phase components. Alternatively, the frequency correction can be applied to the uplink vectors (signal vectors received on the array on the UL) prior to formation of a sample correlation matrix.

In an alternative embodiment, the spatial correlation matrix is computed based on UL channel responses instead of UL received signal vectors. A principle eigen-vector is obtained from the spatial correlation matrix and is then corrected for the frequency difference between the uplink and downlink by adjusting the phase components. Alternatively, the frequency correction can be applied to the channel response vectors prior to formation of the correlation matrix.

Figure 1:
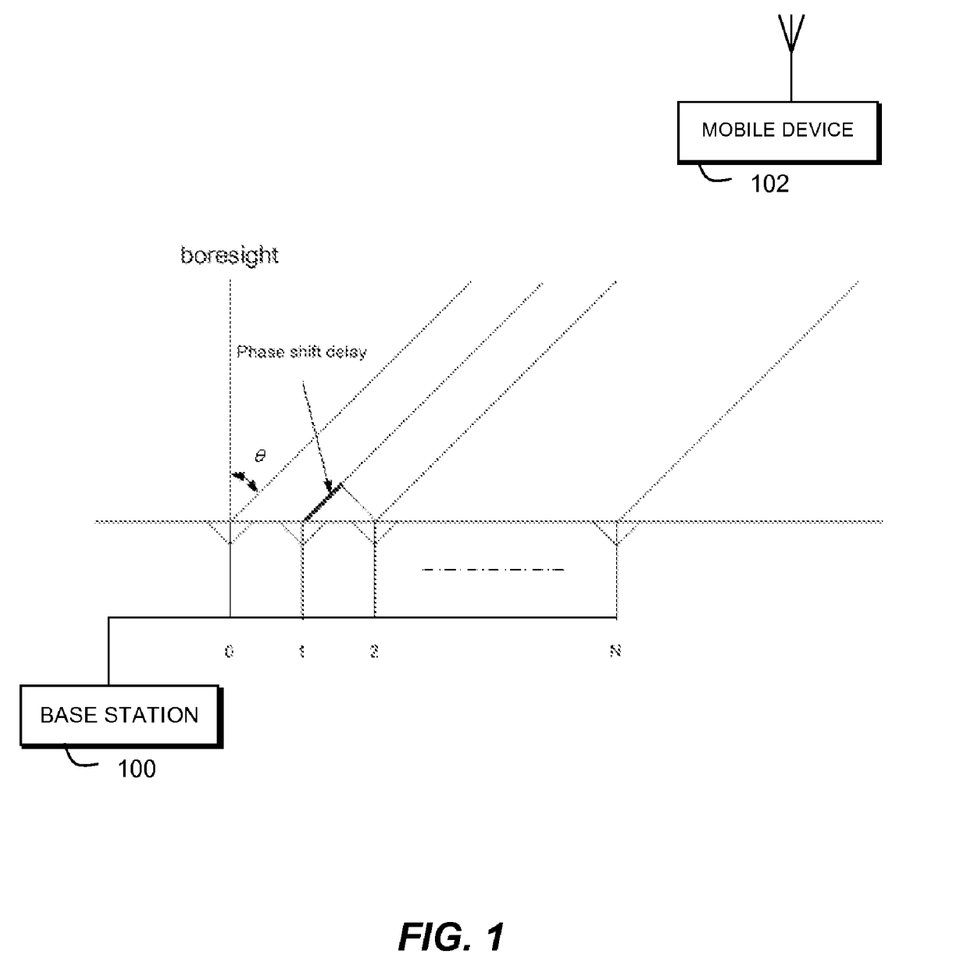
FIG. 1 is a block diagram of a system, in accordance with the present invention.

Referring to FIG. 1, a base station 100 is shown in communication with a mobile station 102 operating near a cell boundary of the base station. A phase array antenna is coupled to a base station with multiple transceivers, which are under control of a processor of the base station. A phased array antenna response to an incident ray from a mobile station communication is depicted, and is expressed as follows;

$$\text{phased array response} = [1 \ e^{-j2\pi d_1 \sin(\theta)} \ldots e^{-j2\pi(N-1)d_1 \sin(\theta)}] \quad \text{Eq. (1)}$$

representing a wave vector, and where the phased array has N antenna elements each spaced D apart, where $d_1$ is the antenna spacing D normalized to the uplink carrier wavelength $\lambda_1$ (i.e. $d_1 = D/\lambda_1$), and $\theta$ is the incident angle as shown.

It can be seen that the array response is dependent on the carrier frequency (via the wavelength $\lambda_1$) and incident angle. When operating in FDD mode, the propagation paths on both uplink and downlink will be the same in terms of their directions of arrival (UL) and departure (DL) and times of arrival at the receiver. Therefore, the array response on the downlink as a function of the angle $\theta$ has the same expression as the uplink except with the replacement of $d_1$ with $d_2 = D/\lambda_2$, $\lambda_2$ denoting downlink carrier wavelength.

In a preferred embodiment, applying this relationship on the phase array response of two frequencies, the beamforming weight from uplink to downlink can be transformed as follows. Obtain a spatial covariance matrix on the uplink $R_u$, and take the eigen-vector $w_u$ corresponding to the greatest eigen-value $v_{max}$ as the beamforming weight (where $w_u R_u = v_{max} \cdot w_u$). The element in vector $w_u$ is assumed to have the form $e^{j2\pi d_1 \phi_i}$ for constant modulus beamforming. It is worth noting that $\phi_i$ only represents a phase value and is not necessarily the same as the angle of any incident ray. For the baseline technique the downlink beamforming weight is derived by frequency transformation as follows;

$$w_d = \left[\left(e^{-j2\pi d_1 \phi_i \frac{d_2}{d_1}}\right)\right]_{1 \times N} \quad \text{Eq. (2)}$$

In effect, the transformation raises the entry to the power $d_2/d_1$ (equivalently $\lambda_1/\lambda_2$) to accomplish the frequency translation (where $\lambda_1$ and $d_1$ are for the uplink and $\lambda_2$ and $\lambda_2$ are for the downlink). The downlink beamforming weight is then used in downlink transmissions to the mobile station. It is worth noting that 360° complementary operation (i.e. phase MODULO 360°) should be taken on $2\pi(d_1\phi_i)(d_2/d_1)$ when there is phase jump with respect to neighboring phase $2\pi(d_1\phi_{i-1})(d_2/d_1)$ (i.e. the phase should be "unwrapped").

An alternative embodiment is to frequency translate sample received vectors prior to forming a sample spatial covariance matrix by taking uplink vector channel estimates $h_k$ or channel sounding (carrier) signals $x_k$ and raise the elements of these vectors to the power $d_2/d_1$ (equivalently $\lambda_1/\lambda_2$) prior to forming the outer product that is then averaged. In other words, translating the channel vectors to the different frequencies prior to computing their outer product and subsequent averaging.

Specifically the weights are given by the (normalized) principal eigenvector of the spatial covariance matrix $$R_{d\_est} = \sum_k x_k \cdot x_k^H \quad \text{Eq. (3)}$$

where $$x_k = \left[|v_{k,i}|\left(e^{-j2\pi\theta_{k,i} \frac{d_2}{d_1}}\right)\right]_{1 \times N} \quad \text{Eq. (4)}$$

is the wave vector of the channel carrier signals, and where $v_k = [|v_{k,i}|(e^{-j2\pi\theta_{k,i}})]_{1 \times N}$ represents the $k^{th}$ vector of received samples on the uplink, and where the $\theta_{k,i}$ are again phase unwrapped. Optionally, the received channel carrier signals $x_k$ can first be divided by the sounding pilot signal to get a "noisy" channel estimate, which can then be translated to the downlink frequency $h_k$ as in Eq.3 above $$R_{d\_est} = \frac{1}{K} \sum_k h_k h_k^H \quad \text{Eq. (5)}$$

Other channel estimation methods may be used to generate the channel estimates used in this equation.

In an alternate embodiment, if manifold calibration is in effect (to eliminate the effect of the gain and phase responses of the transceiver paths on both uplink and downlink), then the estimated uplink covariance matrix can be used to solve for an uplink eigen-beamforming weight vector, which is then correlated against the uplink array manifold (the matrix whose columns are the direction vectors for the space of visible azimuth direction of arrivals around the array). As used herein, "correlate" means taking the conjugate transpose of the eigen beamforming weight vector and multiplying it by the uplink array manifold matrix to produce a correlation vector. Then an estimate of the dominant direction of arrival angle is determined that corresponds to the maximum value of that correlation vector. If entry j has the maximum correlation value then direction vector j of the UL manifold is the dominant direction of arrival where the uplink eigen-beamforming weight vector is trying to point. Then take the downlink manifold vector that corresponds to direction j as the downlink transmit vector. The RF array manifold for uplink and downlink can be calculated based on knowing the array geometry, and would not necessarily need to be specifically measured in order for eigen-beamforming to work well.

To model performance verification, the frequency transformation based eigen-beamforming of the preferred embodiment can be simulated. The instantaneous array response vector $\Theta_u \in C^{N \times 1}$ is the superposition of the multipath components (M paths), each of which arrives at azimuth angle $\theta_i$ (following uniform distribution over the range of $-\pi$ to $\pi$) with complex path gain of $a_i(\theta_i)$ (following normal distribution of variance one).

$$\Theta_u = \begin{bmatrix} 1 & 1 & \cdots & 1 \\ e^{j2\pi d_1 \sin(\theta_1)} & e^{j2\pi d_1 \sin(\theta_2)} & \cdots & e^{j2\pi d_1 \sin(\theta_M)} \\ \vdots & \vdots & \vdots & \vdots \\ e^{j2\pi(N-1)d_1 \sin(\theta_1)} & e^{j2\pi(N-1)d_1 \sin(\theta_2)} & \cdots & e^{j2\pi(N-1)d_1 \sin(\theta_M)} \end{bmatrix} \begin{bmatrix} a_1(\theta_1) \\ a_2(\theta_2) \\ \vdots \\ a_M(\theta_M) \end{bmatrix}$$

The downlink array response is modeled expressed as:

$$\Theta_d = \begin{bmatrix} \alpha_1(\theta_1) & \alpha_1(\theta_2) & \cdots & \alpha_1(\theta_M) \\ \alpha_2(\theta_1)e^{j2\pi d_2 \sin(\theta_1)} & \alpha_2(\theta_2)e^{j2\pi d_2 \sin(\theta_2)} & \cdots & \alpha_2(\theta_M)e^{j2\pi d_2 \sin(\theta_M)} \\ \vdots & \vdots & \vdots & \vdots \\ \alpha_N(\theta_1)e^{j2\pi(N-1)d_2 \sin(\theta_1)} & \alpha_N(\theta_1)e^{j2\pi(N-1)d_2 \sin(\theta_2)} & \cdots & \alpha_N(\theta_1)e^{j2\pi(N-1)d_2 \sin(\theta_M)} \end{bmatrix}$$

$$\begin{bmatrix} a_1(\theta_1)e^{j\phi_1} \\ a_2(\theta_2)e^{j\phi_2} \\ \vdots \\ a_M(\theta_M)e^{j\phi_M} \end{bmatrix}$$

Where $e^{j\Phi_i}$ is a random phase rotation on each path due to different frequency, and $a_n(\theta_m)$ models the $n^{th}$ antenna response variation on the $m^{th}$ incident azimuth at the downlink frequency band (with respect to the antenna response on the uplink frequency). $a_n(\theta_m)$ is taken from the measurement of the antenna array on two frequencies.

Figure 2:
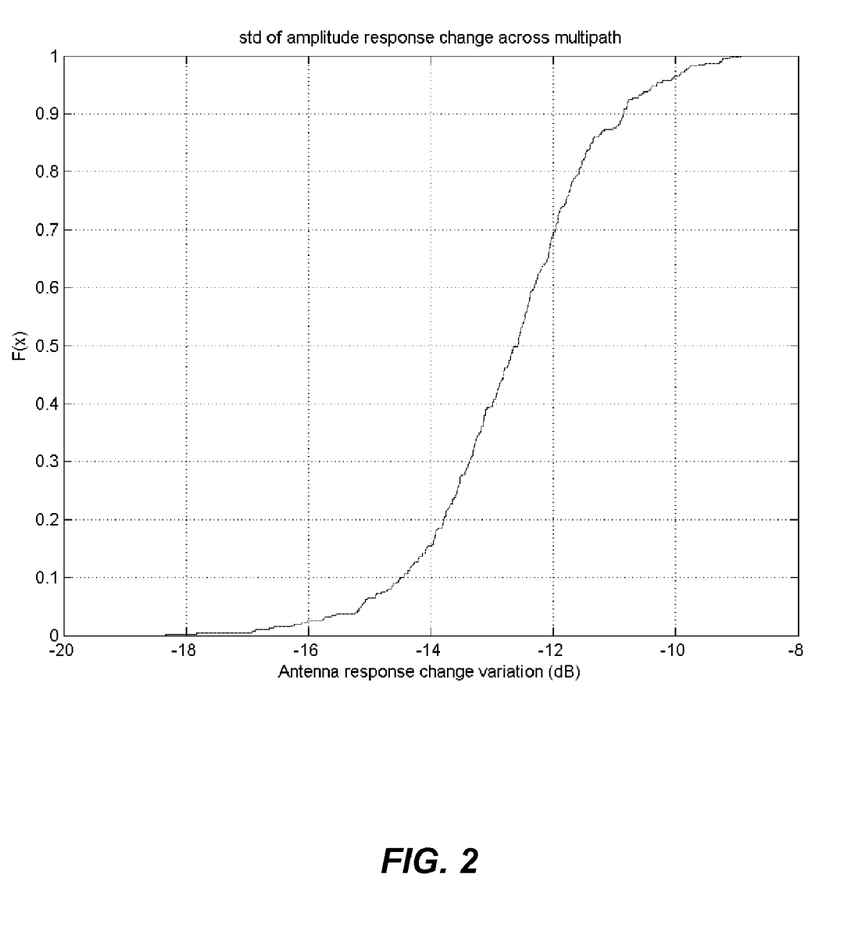
FIGS. 2-5 are illustrations of simulations, in accordance with the present invention.
Figure 3:
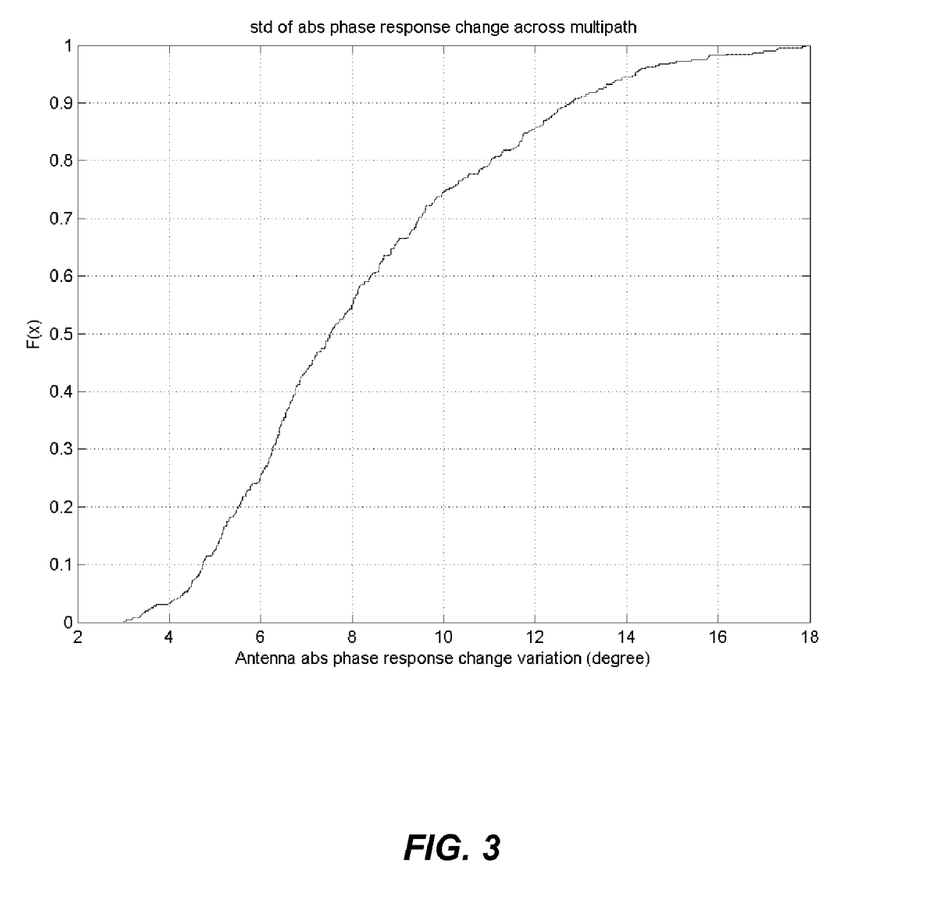

FIGS. 2 and 3 show an amplitude (FIG. 2) and phase (FIG. 3) antenna response variation due to carrier frequencies for different azimuth angles, F(x). It is observed that for the same antenna, the response variation for different azimuth angles (within the main beam for the sectorised antenna) is small (less than $-11$ dB standard deviation and 12 degree standard deviation for the $90^{th}$ percentile).

Numerical results were also calculated for the beam gain loss at the mobile station antenna, i.e.

$$g = \frac{w_d R_d w_d^H}{w_d' R_d w_d'},$$

as the metric of merit where $w'_d$ is the benchmark weight derived from an eigen-decomposition of $R_d$ and $w_d$ is the weight derived from the baseline frequency transformation technique of the present invention.

Figure 4:
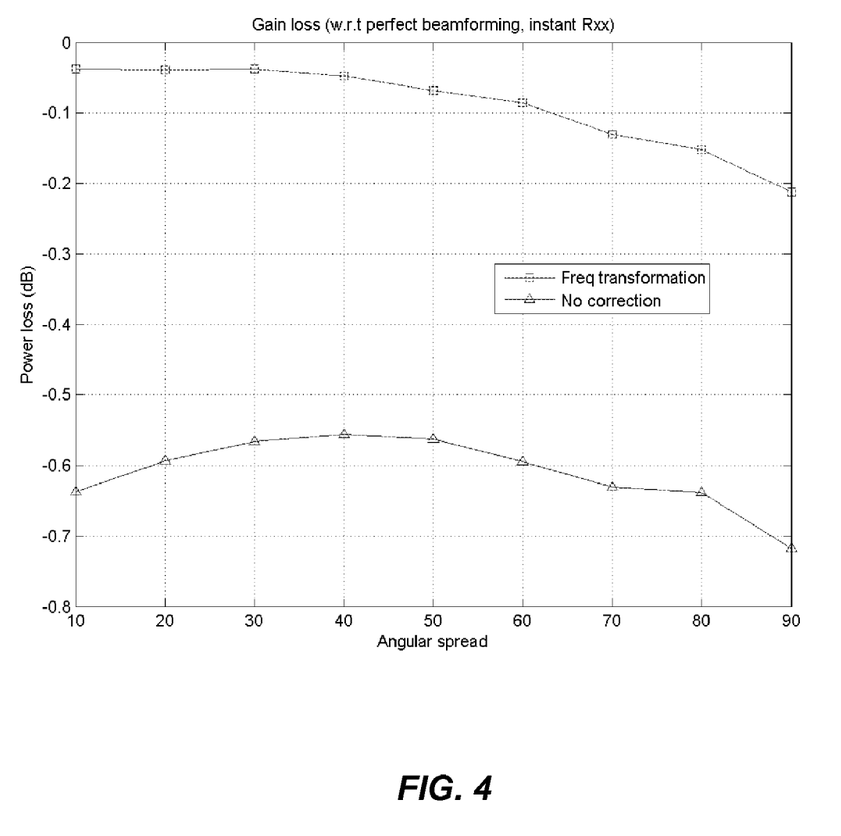

FIG. 4 shows the gain loss averaged over different mean angles of arrival on different angular spread values. There is observed less than 0.1 dB gain loss over medium angular spread range (up to 60 degree angular spread) and more than 0.5 dB power gain over no correction.

Figure 5:
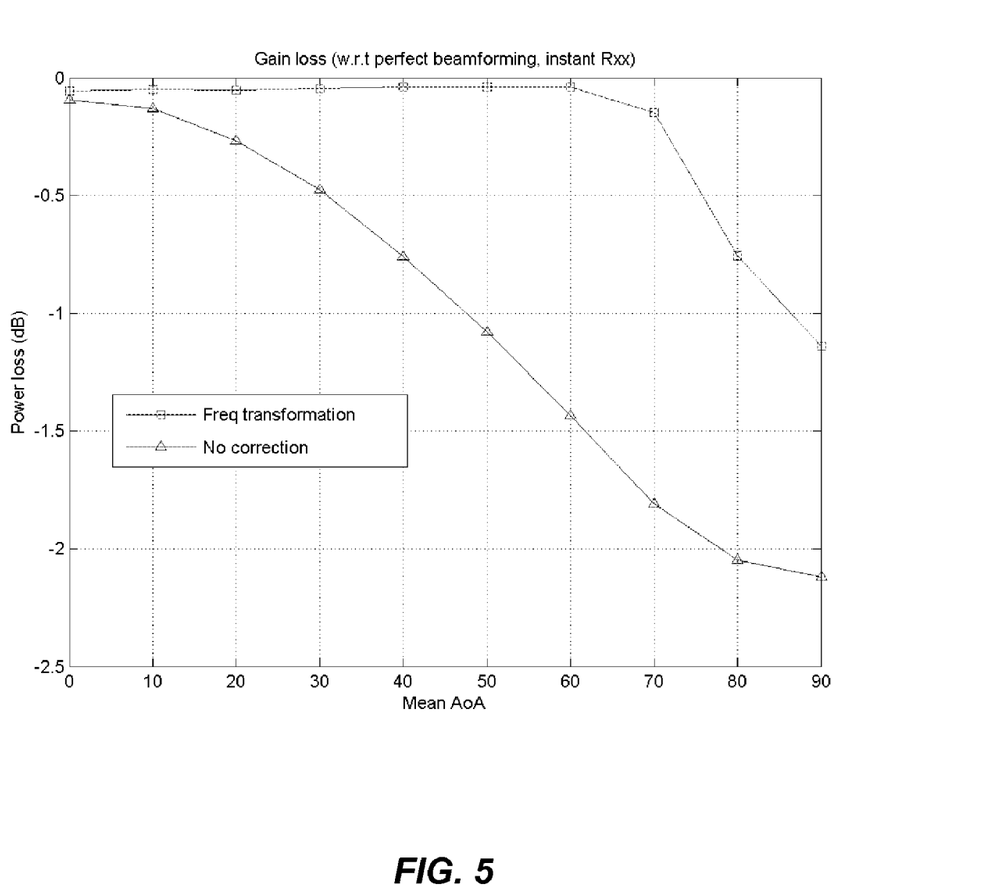

FIG. 5 shows the gain loss on different mean angle of arrival with a fixed 40 degree angular spread. It is observed that the performance of the frequency transformation of the present invention achieves consistent performance (less than 0.1 dB within 60 degree range of angle of arrival) whilst no correction will suffer great loss when the mean angle of arrival deviates from the boresight (more than 1 dB loss when AoA is more than 40 degree). It should be noted that the alternative implementation gives nearly identical results.

Figure 6:
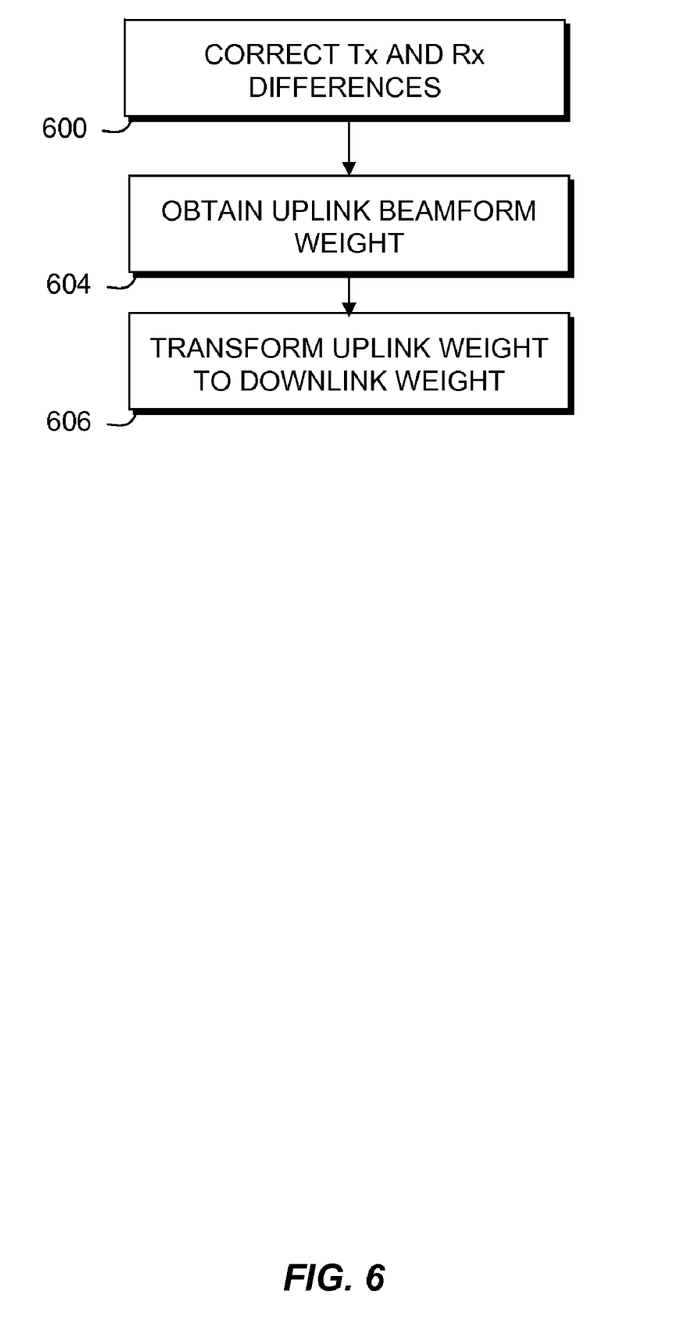
FIG. 6 is a flow diagram of a method in accordance with the present invention.

Referring to FIG. 6, the present invention also describes a method for transmit beamforming in a Frequency Division Duplex (FDD) communication system without using mobile station feedback. In particular, the present invention provides frequency transformation of the phase response in a FDD system.

A first step 600 includes correcting for differences between transceiver receive and transmit responses within a base station, which requires calibration measurements.

A next step 604 includes obtaining at least one beamforming weight of a phase antenna array on an uplink.

A next step 606 includes transforming the at least one uplink beamforming weight to at least one downlink beamforming weight by frequency transformation. Specifically, the frequency transformation is accomplished by applying a phase correction term that is a function of wavelength (and preferably distance between antenna elements) at the uplink and downlink frequencies.

In a first embodiment, step 604 precedes step 606 and includes obtaining an uplink covariance matrix and taking the eigen-vector corresponding to the greatest eigen-value as the uplink beamforming weight. In this embodiment, in step 606 the uplink beamforming weight is transformed to a downlink beamforming weight by correcting for the frequency difference between the uplink and downlink by adjusting phase components. Specifically, the downlink beamforming weight is derived as $$w'_d = \left[\left(e^{-j2\pi d_1 \varphi_i \frac{d_2}{d_1}}\right)\right]_{1 \times N}$$

by frequency transformation.

In a second embodiment, this step 606 precedes step 604 and includes frequency translating sample uplink vectors prior to forming a sample covariance matrix in step 604, wherein the sample uplink eigen-vector corresponding to the greatest eigen-value is taken as the downlink beamforming weight. Specifically, the sample uplink beamforming weights are derived as the principal eigenvector of the matrix $$R_{d\_est} = \sum_k x_k \cdot x_k^H$$

where $$x_k = \left[|v_{k,i}|\left(e^{-j2\pi\theta_{k,i}\frac{d_2}{d_1}}\right)\right]_{1\times N}$$

and where $$v_k = \lfloor |v_{k,i}|(e^{-j2\pi\theta_{k,i}}) \rfloor_{1\times N}$$

represents the $k^{th}$ vector of received samples on the uplink, and wherein the sample uplink eigen-vector corresponding to the greatest eigen-value is taken as the downlink beamforming weight.

It should be noted that in either of the embodiments above, if there is a phase jump between neighboring phases, then a 360° complementary operation should be taken on the frequency transformation.

Advantageously, the present invention mitigates the loss in performance of the adaptive antenna due to uplink/downlink de-correlation in FDD by using a low complexity adjustment of the eigen-beamforming weight vector. This does not require feedback from the mobile.

It will be understood that the terms and expressions used herein have the ordinary meaning as is accorded to such terms and expressions by persons skilled in the field of the invention as set forth above except where specific meanings have otherwise been set forth herein.

The sequences and methods shown and described herein can be carried out in a different order than those described. The particular sequences, functions, and operations depicted in the drawings are merely illustrative of one or more embodiments of the invention, and other implementations will be apparent to those of ordinary skill in the art. The drawings are intended to illustrate various implementations of the invention that can be understood and appropriately carried out by those of ordinary skill in the art. Any arrangement, which is calculated to achieve the same purpose, may be substituted for the specific embodiments shown.

The invention can be implemented in any suitable form including hardware, software, firmware or any combination of these. The invention may optionally be implemented partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements or method steps may be implemented by e.g. a single unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate.

Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc do not preclude a plurality.

Those skilled in the art will recognize that a wide variety of modifications, alterations, and combinations can be made with respect to the above described embodiments without departing from the spirit and scope of the invention, and that such modifications, alterations, and combinations are to be viewed as being within the scope of the invention.

What is claimed is:

1. A method for transmit beamforming in a Frequency Division Duplex communication system, the method comprising the steps of:

correcting for differences between hardware receive and transmit responses within a base station;

obtaining at least one beamforming weight of an antenna array on an uplink; and transforming the at least one uplink beamforming weight to at least one downlink beamforming weight by applying a phase correction that is a function of wavelength at the uplink and downlink frequencies and distance between antenna elements;

wherein the obtaining step precedes the transforming step, and wherein the obtaining step includes obtaining an uplink covariance matrix and taking the eigen-vector corresponding to the greatest eigen-value as the uplink beamforming weight.

2. The method of claim 1 wherein the transforming step includes deriving the downlink beamforming as $$w_d = \left[\left(e^{-j2\pi d_1 \varphi_i \frac{d_2}{d_1}}\right)\right]_{1\times N}$$

by frequency transformation.

3. A method for transmit beamforming in a Frequency Division Duplex communication system, the method comprising the steps of:

correcting for differences between hardware receive and transmit responses within a base station;

obtaining at least one beamforming weight of an antenna array on an uplink; and transforming the at least one uplink beamforming weight to at least one downlink beamforming weight by applying a phase correction that is a function of wavelength at the uplink and downlink frequencies and distance between antenna elements;

wherein the transforming step precedes the obtaining step, and wherein the transforming step includes translating sample uplink vectors prior to forming a sample covariance matrix in the obtaining step, wherein the sample uplink eigen-vector corresponding to the greatest eigen-value is taken as the downlink beamforming weight.

4. The method of claim 3 wherein the transforming step includes deriving sample uplink beamforming weights as the principal eigenvector of the $$R_{d\_est} = \sum_k x_k . x_k^H$$

where $$x_k = \left[|v_{k,i}|\left(e^{-j2\pi\theta_{k,i}\frac{d_2}{d_1}}\right)\right]_{1\times N}$$

and where $$v_k = [|v_{k,i}|(e^{-j2\pi\theta_{k,i}})]_{1\times N}$$

wherein the sample uplink eigen-vector corresponding to the greatest eigen-value is taken as the downlink beamforming weight.

5. A base station for transmit beamforming in a Frequency Division Duplex communication system, the system comprising:
an antenna array coupled to a transceiver, wherein the transceiver is operable to obtaining at least one beamforming weight of an antenna array on an uplink; and
a processor coupled to the transceiver, the processor operable to transforming the at least one uplink beamforming weight to at least one downlink beamforming weight by applying a phase correction that is a function of wavelength at the uplink and downlink frequencies, wherein the downlink beamforming weight is used in downlink transmission of the transceiver;
wherein the transceiver first obtains the at least one beamforming weight of an antenna array by obtaining an uplink covariance matrix and taking the eigen-vector corresponding to the greatest eigen-value as the uplink beamforming weight, which is followed by the processor performing the transforming step.

6. The base station of claim 5 wherein the processor applies a phase correction term that is a function of wavelength at the uplink and downlink frequencies and distance between antenna elements.

7. The base station of claim 5 wherein the processor derives the downlink beamforming as $$w_d = \left[\left(e^{-j2\pi d_1 \varphi_i \frac{d_2}{d_1}}\right)\right]_{1\times N}$$

by frequency transformation.

8. A base station for transmit beamforming in a Frequency Division Duplex communication system, the system comprising:
an antenna array coupled to a transceiver, wherein the transceiver is operable to obtaining at least one beamforming weight of an antenna array on an uplink; and
a processor coupled to the transceiver, the processor operable to transforming the at least one uplink beamforming weight to at least one downlink beamforming weight by applying a phase correction that is a function of wavelength at the uplink and downlink frequencies, wherein the downlink beamforming weight is used in downlink transmission of the transceiver;
wherein the processor first frequency translates sample uplink vectors, which is followed by the step of forming a sample covariance matrix, wherein the sample uplink eigen-vector corresponding to the greatest eigen-value is taken as the downlink beamforming weight.

9. The system of claim 8 wherein the processor derive sample uplink beamforming weights as the principal eigenvector of the matrix $$R_{d\_est} = \sum_k x_k . x_k^H$$

where $$x_k = \left[|v_{k,i}|\left(e^{-j2\pi\theta_{k,i}\frac{d_2}{d_1}}\right)\right]_{1\times N}$$

and where $$v_k = [|v_{k,i}|(e^{-j2\pi\theta_{k,i}})]_{1\times N}$$

represents the $k^{th}$ vector of received samples on the uplink, and wherein the sample uplink eigen-vector corresponding to the greatest eigen-value is taken as the downlink beamforming weight.

* * * * *